Nov. 24, 1959  J. HERTRICH  2,914,079
QUICK ACTING CONTROL VALVE FOR WATER DRIVEN CENTRIFUGAL MACHINES
Original Filed April 6, 1954
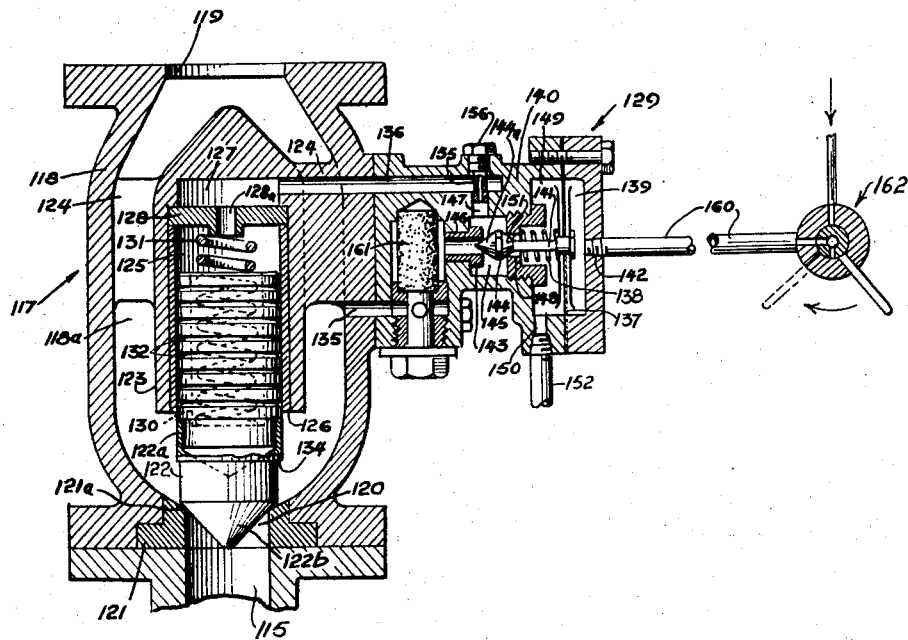
INVENTOR
Joseph Hertrich deceased
By Elise Hertrich Executrix
BY
Pollard, Johnston,
Smythe and Robertson
ATTORNEYS

United States Patent Office 2,914,079
Patented Nov. 24, 1959

2,914,079

QUICK ACTING CONTROL VALVE FOR WATER DRIVEN CENTRIFUGAL MACHINES

Joseph Hertrich, deceased, late of Hamilton, Ohio, by Elise Hertrich, executrix, Hamilton, Ohio; said Joseph Hertrich assignor to The Western States Machine Company, Hamilton, Ohio, a corporation of Utah Original application April 6, 1954, Serial No. 421,383. Divided and this application April 6, 1955, Serial No. 501,683

2 Claims. (Cl. 137—219)

This application is a division of application Serial No. 421,383, filed April 6, 1954.

This invention relates to new and useful improvements in control valves suitable for controlling, among other things, the flow of water used as the motive power for heavy water driven gyratory centrifugal machines of a type used for the manufacture of sugar.

An important object of this invention is to provide an improved control valve for centrifugal machines driven by a water turbine, which causes the machine to accelerate at a uniform rate under a safely limited torque input, and whereby the motive water power is cut off in instantaneous response to a power failure in the control system so as to discontinue the driving action on the machine.

Another object is to provide a flow control device for regulating the jet of a water turbine, such device being particularly suited for remote control by automatic control means.

A control organization for a hydraulic turbine according to this invention includes a nozzle for directing a jet of liquid against the turbine wheel and means for selectively supplying liquid under pressure to the nozzle. The means for supplying liquid comprises a pressure liquid chamber having an outlet connected with said nozzle and a valve member in said chamber movable to open and close said outlet. Yieldable means are provided to urge the valve closed, and the valve is equipped with means responsive to liquid pressure in the chamber for overbalancing the force of the yieldable means to urge the valve open. Secondary means normally responsive to liquid pressure in said chamber are provided for urging the valve closed with a force additive to the force of the said yieldable means, and remotely controllable means are provided to relieve the liquid pressure acting on the secondary means to control the opening and closing of the valve.

Other objects, features and advantages of this invention will be apparent from the following detailed description of an illustrative embodiment and from the accompanying drawing thereof.

The drawing is a longitudinal cross-section through a preferred form of the control valve.

Control of the power developed by a water turbine for bringing a heavy gyratory centrifugal machine to the desired full operating speed is effected by a water flow control valve 117 which is used, for example, to regulate the water flow through a nozzle that directs a jet of the water into an impulse turbine driving the machine. To provide the high power necessary for acceleration of the machine, the nozzle is opened to direct the water jet against the wheel. When the full speed of the machine is reached the nozzle may be closed to allow the machine to coast at high speed without continued motive power. The control valve is a pressure responsive quick acting valve which is particularly suitable for remote control by suitable automatic control means.

As seen in the drawing, valve 117 includes an elongated, hollow, valve body 118 having an inlet 119 at one end, an axially aligned outlet 120 at the other end and a water chamber 118a between the ends. Outlet 120 is defined by a replaceable, wear-resistant ring 121 that forms an annular seat 121a for the conical tip 122b of an axially reciprocable valve needle 122. A substantially cylindrical needle housing 123 is disposed within and on the axis of the valve body 118 in spaced relation to the surrounding wall of the water chamber, housing 123 being supported in that position by ribs 124 extending from the chamber wall. The needle housing forms an elongated cylindrical chamber 125 which is open at its end nearer to outlet 120 and which slidably receives needle 122 through the open end. A lining 126 forms the inner wall of chamber 125, and a rear end wall of this chamber is formed by a plate 128 which constitutes a spring seat having an aperture 128a to connect chamber 125 with a cavity 127 in the rear end of housing 123a. The cylindrical stem or plunger 122a of the needle is sealed against the inner cylindrical surface of lining 126 and is provided with a series of external grooves 132 which assist the sliding and sealing actions of the needle.

The needle 122 is formed with an axial cavity 130 that opens from its rear end into chamber 125 and receives a compression spring 131 bearing against the plate 128. The spring serves to move the needle to its closed position against the valve seat under circumstances hereinafter described.

The pressure of water in chamber 118a of the valve body 118 can be transmitted into chamber 125, for applying pressure to the back of needle 122, through a pilot valve indicated generally at 129, a duct 135 leading into the pilot valve from chamber 118a, and a duct 136 leading into cavity 127 from the pilot valve.

The pilot valve 129 includes a valve body 140 having therein a chamber 145 which communicates with duct 135 through port 146 and a filter plug 161 and communicates with duct 136 through a port 147 containing a restricted passageway or bleeder 155 for limiting the rate of water flow into and from the needle housing. The wall of chamber 145 opposite to port 146 has an outlet opening 151 which normally is closed by a movable valve needle 144 held against the mouth of this opening by a spring 138. A forward surface 144a of the same valve needle is arranged to open and close the passageway through port 146 by movement of the needle relative to seat element 143 in port 146, the arrangement being such that port 146 is open when port 151 is closed by needle 144 and port 151 is open when port 146 is closed thereby. When port 151 is open, water can flow freely through it into a chamber 149 of the pilot valve body and thence through port 150 at the bottom of that chamber into a drain pipe 152.

The pilot valve needle 144 has a stem 141 which extends backward through port 151 and chamber 149 to a connection with a fluid-tight diaphragm 137 which separates chamber 149 from another chamber 139 at the end of the pilot valve body. The compression spring 138 surrounds stem 141 and bears against the diaphragm 137, thus normally holding the valve needle in closed relation to port 151. Chamber 139, however, is connected with a conduit 160 through which compressed air may be admitted into this chamber, and when the pressure against diaphragm 137 of air in chamber 139 exceeds the pressure of spring 138, the valve needle 144 is moved from its normal position in which port 151 is closed to a position in which port 146 is closed.

Accordingly, the admission of compressed air to the pilot valve through conduit 160 serves to close the passageways connecting the water chamber 118a with the main needle chamber 125 and to release through bleeder 155 and port 151 any water pressure existing in chamber 125, while the venting of air pressure from the pilot valve serves to interconnect chamber 118a and chamber 125 so that the pressure of water in the former will be transmitted into the latter and thus will be applied to the rear end of the plunger 122a of needle 122. It results that in the normal position of the pilot valve, the full water pressure being applied to the rear end of the valve needle 122, this pressure together with the force of the spring 131 will move needle 122 to its closed position where the needle will be held as long as the pilot valve stays in normal position thus preventing the passage of water to the nozzle 103 or 104 of the impulse wheel.

It will be noted further, however, that the plunger portion 122a of needle 122 terminates at a forwardly facing shoulder 134 on a forward part of this needle within water chamber 118a. This shoulder presents a sufficient area that the backward pressure exerted against it by the water present in chamber 118a substantially exceeds the forward seating force exerted on needle 122 by the weight of the needle and/or by the compression spring 131 when the needle is in its seated position. Accordingly, when the pilot valve 129 is moved from its normal closed position to its other or active position, the water pressure normally applied against the back end of needle 122 is released from chamber 125, and the backward pressure still exerted on shoulder 134 then moves needle 122 away from its seated position. To facilitate this unseating movement, the spring 131 may be made or arranged so that it exerts little or no force until the needle has moved a substantial distance, say ⅛ of an inch, away from seat 121a. As the needle moves to open port 120, the conical end surface 122b also becomes subject to the pressure of the water supply; so this pressure continues to move the needle backward against spring 131 until the valve is fully open. The water in chamber 118a then flows under its full pressure through port 120 and passage 115 to form a wheel-driving jet as it issues from a water nozzle.

If any failure occurs in the supply of air pressure for the pilot valve, the water jet driving the machine is automatically cut off by action of the control valve, due to the release of air pressure from chamber 139 and the resulting closing movement of needle 122.

In the use of the control valve, the inlet 119 is connected with a source of water held constantly under a pressure suitable for driving the water turbine, and the compressed air line 160 is connected through a suitable air valve, for example, a hand operated or solenoid-operated three-way air valve, with a source of air held constantly under a pressure sufficient to overbalance the pilot valve spring 138. A hand operated three-way air valve is illustrated diagrammatically at 162 in the drawing. When a solenoid-operated air valve is used, it may be actuated by electrical control means of a type widely used for controlling the operations of sugar centrifugals.

It will be understood that the new features of this invention may be embodied in various forms of apparatus without restriction to details of the illustrated embodiment.

What is claimed is:

1. A flow control device for a pressure fluid conduit comprising an elongated hollow valve body having inlet and outlet openings at the respective ends thereof and forming a pressure chamber between said openings, an elongated cylindrical plunger housing axially disposed within and in spaced relation to the walls of said chamber, a valve plunger movable axially within said housing between positions opening and closing said outlet opening, yieldable means positioned in said housing to be compressed by opening movement of said plunger and for applying a force urging the plunger towards closed position, said plunger having a forwardly facing shoulder formed thereon which is responsive to fluid pressure in said chamber for applying a force sufficient to overbalance the force of said yieldable means so as to urge said plunger towards open position, said plunger having a rear face disposed within said housing, duct means normally operative to conduct the fluid pressure in said chamber to said rear face to urge said plunger towards closed position with a force additive to the force of said yieldable means, means operable to close said duct means and simultaneously relieve the fluid pressure acting on said rear face whereby the pressure on said shoulder will move the plunger to open position, and remote control means for operating said last-recited means.

2. A flow control device for a pressure fluid conduit comprising an elongated hollow valve body having inlet and outlet openings at the respective ends thereof and forming a pressure chamber between said openings, an elongated cylindrical plunger housing axially supported within and in spaced relation to the walls of said valve body by rib means having duct means formed therein, a valve plunger movable axially within said housing between positions opening and closing said outlet opening, yieldable means positioned to be compressed by said plunger for applying a force urging the plunger towards closed position, said plunger having a forward face seatable in said outlet opening to close the outlet opening and responsive when unseated to fluid pressure in said chamber for applying a force overbalancing the force of said yieldable means so as to urge the plunger toward open position, said plunger having a rear face disposed within said housing and responsive when subjected to the fluid pressure in said chamber to urge the plunger toward closed position with a force additive to the force of said yieldable means, means including a pilot valve connected to said duct means for admitting a supply of fluid under pressure from said chamber to, and for releasing fluid under pressure from, said pressure responsive rear face, spring means normally holding the pilot valve in one position in which it opens the fluid supply to said pressure responsive rear face, and means responsive to an independent source of control fluid under pressure for overbalancing the force of said spring means and moving said valve to another position in which it concomitantly closes said fluid supply and releases the fluid pressure from said rear face, said plunger having a forwardly facing shoulder formed thereon which is continuously responsive to fluid pressure in said chamber to apply a relatively small force in a direction urging the plunger toward open position, said force being much below the force applied by the fluid pressure on said rear face but sufficient to unseat the plunger when the latter pressure is released.

References Cited in the file of this patent

UNITED STATES PATENTS

| | | |
|---|---|---|
| 753,155 | MacFarlane | Feb. 23, 1904 |
| 845,058 | Dake | Feb. 26, 1907 |
| 1,918,891 | Barrett | July 18, 1933 |
| 1,925,301 | Campbell | Sept. 5, 1933 |
| 2,085,893 | Boland | July 6, 1937 |
| 2,124,619 | Kerr | July 26, 1938 |
| 2,304,323 | Wiegers | Dec. 8, 1942 |
| 2,402,496 | Hertrich | June 18, 1946 |
| 2,609,832 | Smith | Sept. 9, 1952 |